United States Patent
Wright

(10) Patent No.: US 8,302,927 B2
(45) Date of Patent: Nov. 6, 2012

(54) LAWN MOWER TILT TOOL

(76) Inventor: Arthur A. Wright, Beckley, WV (US)

(*) Notice: Subject to any disclaimer, the term of this patent is extended or adjusted under 35 U.S.C. 154(b) by 354 days.

(21) Appl. No.: 12/574,269

(22) Filed: Oct. 6, 2009

(65) Prior Publication Data

US 2010/0187398 A1    Jul. 29, 2010

Related U.S. Application Data

(60) Provisional application No. 61/146,699, filed on Jan. 23, 2009.

(51) Int. Cl.
*F16L 3/08* (2006.01)
*A45F 3/44* (2006.01)
*F16M 13/00* (2006.01)
*A47B 97/00* (2006.01)
*B25B 1/00* (2006.01)
*B23Q 3/00* (2006.01)

(52) U.S. Cl. .......... 248/500; 248/65; 248/156; 248/545; 248/547; 269/3; 269/6; 269/95

(58) Field of Classification Search .............. 248/56, 248/65, 126, 176.1, 304, 305, 499, 500, 508, 248/530, 544, 546, 547, 510, 54, 545, 156, 248/680; 269/3, 6, 95, 53, 54.1, 100
See application file for complete search history.

(56) References Cited

U.S. PATENT DOCUMENTS

| | | | |
|---|---|---|---|
| D26,680 S * | 2/1897 | Faatz | D8/371 |
| 1,056,596 A * | 3/1913 | Sidoli | 248/65 |
| 1,081,513 A * | 12/1913 | Peterson | 269/3 |
| D52,052 S | 5/1918 | Baird et al. | |
| 1,445,263 A | 2/1923 | Asper | |
| 1,600,224 A * | 9/1926 | Grundy | 248/71 |
| 1,793,060 A | 2/1931 | Clements | |
| 1,801,810 A | 4/1931 | Goodson | |
| D133,484 S | 8/1942 | Orr | |
| 2,537,380 A | 1/1951 | Travis | |
| 2,863,635 A | 12/1958 | Fandrich | |
| 3,154,275 A * | 10/1964 | Stewart | 248/65 |
| 3,680,834 A | 8/1972 | Holloway | |
| 3,870,428 A * | 3/1975 | Jackson | 404/134 |
| 4,089,141 A * | 5/1978 | Heroux | 52/105 |
| D350,270 S | 9/1994 | Jensen | |
| 5,797,226 A * | 8/1998 | MacKarvich | 52/155 |
| 5,897,082 A * | 4/1999 | Losada | 248/65 |
| 6,244,800 B1* | 6/2001 | Studanski | 410/3 |
| D444,690 S | 7/2001 | Bond | |
| 6,460,820 B1* | 10/2002 | Kopp | 248/500 |
| 6,488,255 B2* | 12/2002 | Lowmaster | 248/545 |
| 6,550,577 B1* | 4/2003 | Allgire | 182/107 |
| 7,789,359 B2* | 9/2010 | Chopp et al. | 248/211 |
| 2006/0091366 A1 | 5/2006 | Sykes, Jr. | |
| 2008/0083441 A1* | 4/2008 | Smutzer | 135/16 |

* cited by examiner

*Primary Examiner* — Teri P. Luu
*Assistant Examiner* — Chiedu Chibogu
(74) *Attorney, Agent, or Firm* — Pearne & Gordon LLP

(57) ABSTRACT

A tool and method for holding a rotary lawnmower in a tilted position to expose the underside of its deck for maintenance, comprising a bracket having an anchoring portion and a receiving pocket joined to the anchoring portion, the anchoring portion being adapted to be operatively mounted on a vertical wall or post surface or held down at or near a floor or ground level, the receiving pocket being arranged when the anchoring portion is operatively mounted to receive a horizontal hand grip of the distal end of a lawnmower handle, and a lock member deployable on said bracket to selectively retain or release the hand grip in or from the receiving pocket.

1 Claim, 3 Drawing Sheets ated to mowers. A longstanding problem with these machines is the tendency of grass, particularly when it is wet, to adhere to the underside of the mower deck.
LAWN MOWER TILT TOOL This application claims the priority of U.S. Provisional Application No. 61/146,699, filed Jan. 23, 2009.

BACKGROUND OF THE INVENTION

The invention relates to a tool for facilitating the inspection and maintenance at the underside of a rotary lawnmower.

PRIOR ART

Rotary lawnmowers are the most common type used for lawn care in the United States. A longstanding problem with these machines is the tendency of grass, particularly when it is wet, to adhere to the underside of the mower deck. Although not a major problem when the machine is operating, this accumulation poses problems when the machine is stored between periods of usage. First, excess clippings typically fall off the mower as it is being moved into the storage space, especially if it has to move over anything but a smooth surface. These droppings, particularly at residential or commercially developed properties require extra clean-up effort. Especially when the mower is put away wet, the accumulated under deck clippings tend to rot and product a foul odor. Additionally, the wet clippings, when not removed, promote excessive corrosion of the deck.

Besides the frequent build-up of clippings on the underside of the deck, there is a need from time-to-time to inspect the blade, sharpen it, or replace it, and to change motor oil by draining it from the underside of the deck.

To clean the underside of the mower deck, tend to the blade, or change oil, it is typically necessary to expose the underside of the deck. People often attempt to turn a walk-behind rotary mower on its side or upside down to expose the deck underside. This can be both dangerous and harmful to the engine. Upsetting the mower can cause its fuel to spill out of the gas tank and cause engine oil to leak out through its fill tube or leak into the combustion chamber. External oil leaks require clean-up and replacement. If the lost oil is not replaced, the engine will fail prematurely. An internal leak of oil into the combustion chamber can, at a minimum, foul the spark plug. Worse, the engine can lock-up causing damage to the starter mechanism whether manual or power assisted. From the foregoing brief discussion, it is clear that there is a need for a device to conveniently and safely tilt a walk-behind rotary mower to provide access to the underside of the mower deck.

SUMMARY OF THE INVENTION

The invention provides a tool and method of conveniently and safely tilting a rotary motor to temporarily expose the underside of the mower deck. The tool of the invention is constructed to hold the mower handle adjacent ground level with its rear wheels on the ground, thus providing a stable position while affording access to the deck underside and avoiding spillage of gasoline and/or crankcase oil.

The tool of the invention can be arranged to be anchored to the ground or to a vertical surface provided by a wall, post, or the like. The tool is formed with a pocket sized and oriented to receive the hand grip of the mower handle. A lock is provided at the pocket to releasably retain the hand grip in position and resist forces, developed when the deck is cleaned or other work is performed on the blade or engine that could otherwise dislodge the hand grip from the pocket.

In various disclosed embodiments, the tool comprises a bracket fabricated from flat steel strip and an anchoring rod when the tool is used in a grassy or otherwise unpaved area. As disclosed, the anchor rod can be permanently attached to the bracket or can be a separate piece. A part of the steel strip is conveniently formed into a U-shape to provide the mower hand grip receiving pocket. A locking pin is inserted in a pair of aligned holes in opposite sides of the pocket after the hand grip is positioned in the pocket to releasably lock the hand grip in the pocket.

DESCRIPTION OF THE PREFERRED EMBODIMENTS

Figure 1:
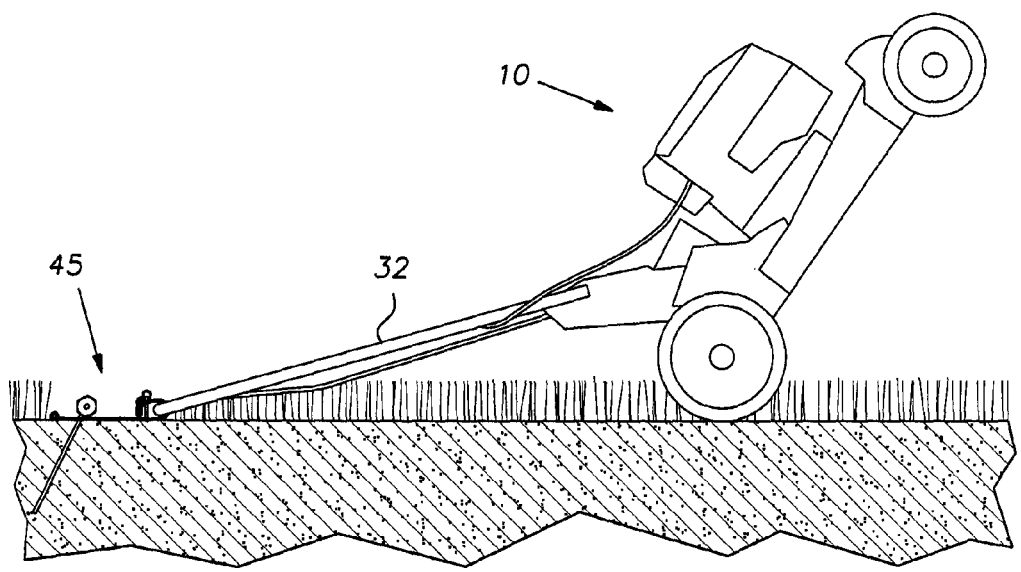
FIG. 1 is a somewhat schematic side elevational view of one form of the invention being used to tilt a walk behind rotary lawnmower for access to the underside of the mower.

The figures illustrate various embodiments of the present invention embodied in a tool to tilt a generally conventional walk-behind rotary lawnmower 11 (FIG. 1) for visual and physical access to the underside of the deck of the mower. In each of the tools, the same or equivalent features or elements are given the same reference numeral in the figures and the following description. In all of the illustrated embodiments of the tool, a main anchor bracket part is fabricated of a steel strip, such as ⅛" by 2" material.

Figure 1A:
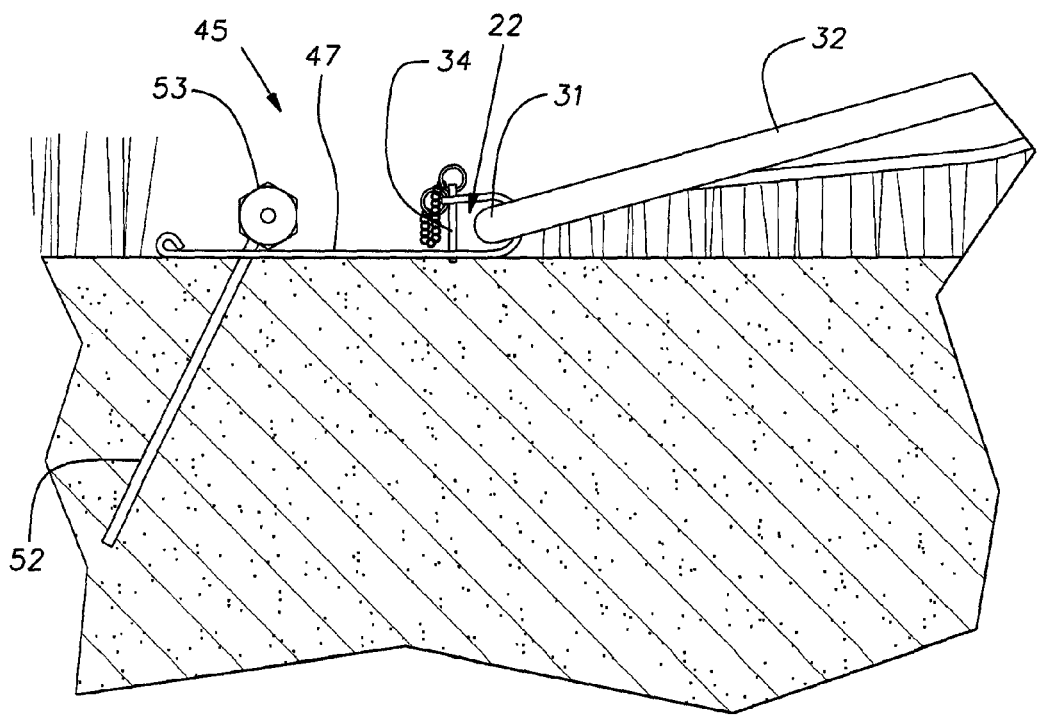
FIG. 1A is an enlarged side elevational view of the inventive tool shown in FIG. 1.
Figures 2, 3:
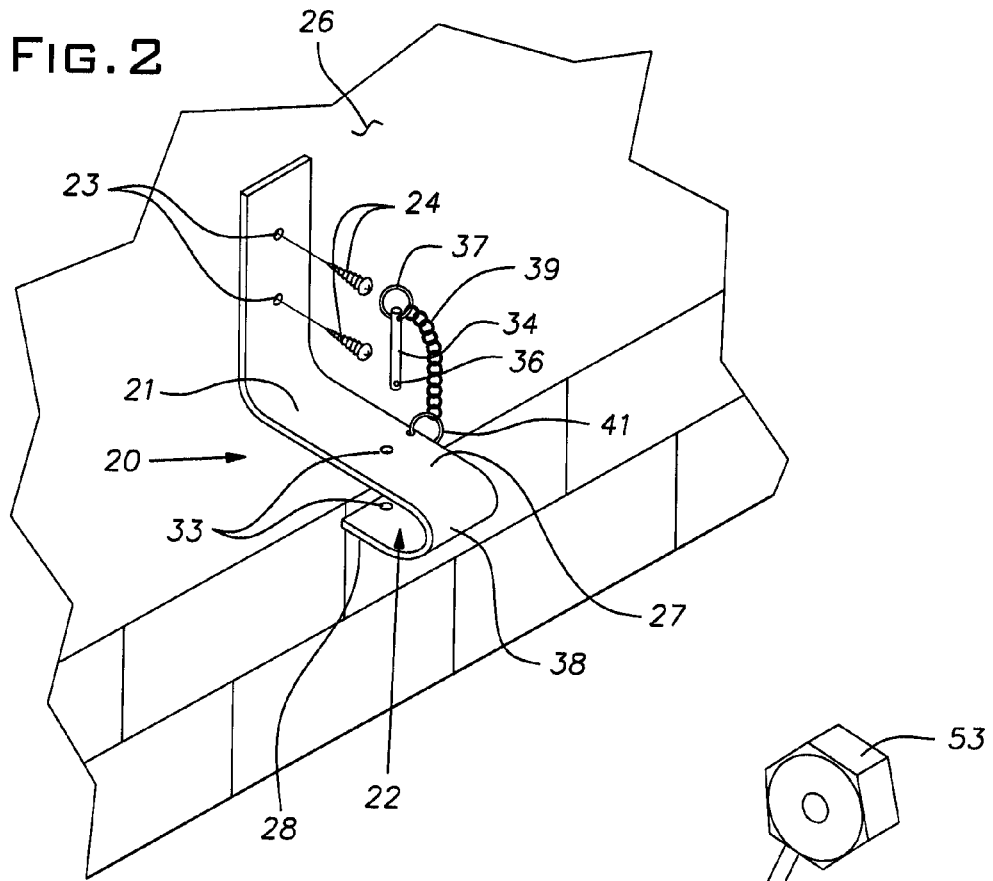
FIG. 2 is a perspective partially exploded view of a second form of the mower tilt tool applied to a vertical surface.
FIG. 3 is an exploded full view of an embodiment of the mower tilt tool of the invention partially shown in FIGS. 1 and 1A.

Referring now to FIG. 2, there is shown a tool 20 fabricated of steel strip. The tool or bracket 20 includes an anchor portion 21 and a handle grip receiving pocket 22. The anchor portion 21 has holes 23 for receiving fasteners 24, such as screws that can be driven into a vertical surface 26 provided by a wall of a structure such as a garage or shed. Alternatively, the vertical surface can be provided by a self-standing post or fence, for example. The receiving pocket is on a part of the anchor portion 21 that is at right angles to the part in which the holes 23 are located. The receiving pocket 22 is formed by bending the steel strip into a U-shape comprising opposed walls 27, 28 spaced a distance of at least enough to provide clearance for receiving a horizontally disposed hand grip 31 (FIG. 1A) of a handle 32 of the mower 10. Typically, the hand grip will have a diameter of about 1" or metric equivalent. Each of the opposed walls 27, 28 have a hole 33 aligned with the opposite hole for reception of a round pin 34 which can be a "hitch" style of known construction having a spring-loaded detent ball 36 at one end, and a pull ring 37 at the opposite end. The pin 34 is of a length sufficient to pass through both holes 33. The holes 33 are located a distance from a web or bight area 38 of the steel strip between the opposed walls 27, 28 to permit a hand grip 31 to be received in the pocket 22 without interference when the pin 34 is inserted in the holes 33. After the hand grip 31 has been drawn down from the normal operating position of the mower 10 and inserted in the pocket 22, the pin 34 is positioned in the holes 33 to releasably lock the hand grip 31 in the receiving pocket. During periods of non-use of the tool 20, the locking pin 34 is retained with the main part of the tool 20 by a light duty chain 39 serving as a lanyard. The chain 39 is fastened to the main part of the tool 20 by a ring 41 looped through the chain and a hole in one of the opposed walls 27. It is desirable that the tool 20 be secured to the vertical surface 26 as close to the ground or floor as is practical so as to provide maximum tilt for the mower 10. The tool 20 is used to tilt the mower 10 as is suggested in FIG. 1 and the same is true for various other embodiments of the invention described below.

Referring to FIG. 3, there is shown a tool 45 that has its anchor portion 21 capable of being fixed in either of two ways and which can be separated to facilitate its use in such ways. More specifically, the tool 45 has a pin joint 46 at a mid-area of the anchor portion 21. The pin joint 46 permits a lower section 47 to be separated from an upper section 48. Holes 23 can be used with fasteners 24 to secure the tool 45 to a vertical rigid surface. When a pin 49 is pulled along its axis away from the anchor portion 21, the lower and upper sections 47, 48 can be separated in the manner that a conventional hinge can be separated. The lower section 47 includes a relatively large hole or aperture 51. The tool 45 includes an elongated steel rod 52, typically of a diameter of ⅜", more or less, or metric equivalent. A hand hold 53 such as in the form of a knob, is welded or otherwise provided at one end of the rod 52 for applying installation or removal forces to the rod. The tool 45 can be used in an unpaved earthen area such as an area of grass as shown in FIG. 1A, by laying the lower section 47 on the ground and driving the rod 52 through the enlarged hole 51 into the earth. As indicated, the lower section 47 can be detached from the upper section 48 and the pin 49 when it is used in this mode. The upper section 47 can be left in place screwed on a wall such as the inside of a garage when it is desired to tilt the mower 10 outdoors for cleaning purposes. The rod 52 is driven into the ground until the hand hold 53 bears against the lower section 47 thereby retaining this lower section in contact with the ground surface. Preferably, the rod 52 is driven at an angle with respect to the vertical direction so that a simple vertical force on the lower section such as might be developed by the weight of the mower 10 transferred to the lower section 47 by the mower handle hand grip 31.

It will be noted that in all of the disclosed versions of the tool, the receiving pocket 22 is open in a direction opposite the direction to which the mower 10 lies relative to the tool. That is, the pocket 22 opens to a direction away from the location of the mower 10 which it tilts.

Figure 4:
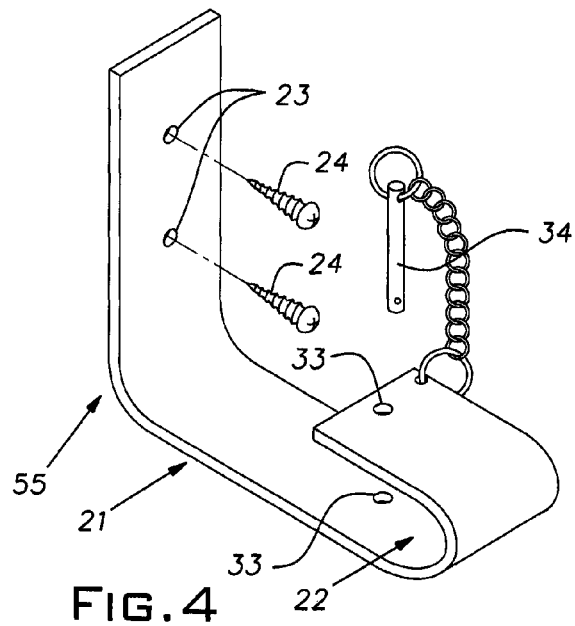
FIG. 4 is an exploded view of still another embodiment of the mower tilt tool of the invention.

Referring now to FIG. 4, a still further embodiment of a tool 55 constructed in accordance with the invention is illustrated. The tool 55 includes an anchor portion 21 and a receiving pocket 22. The tool 55 has similarities to both the tool 20 and tool 45 in construction and function.

Figure 5:
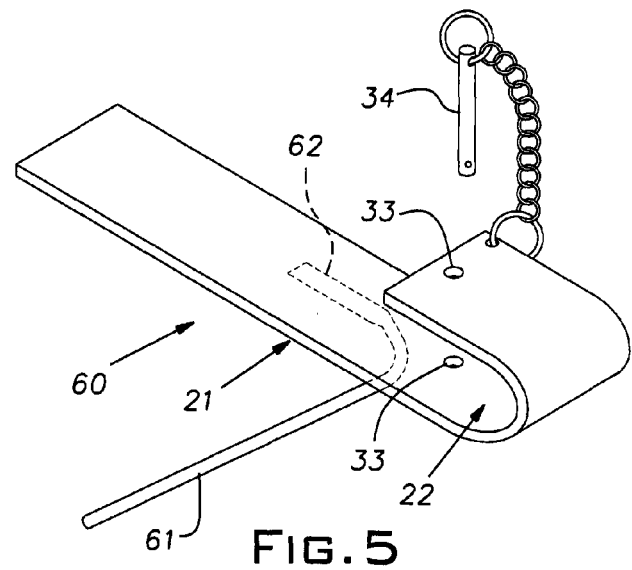
FIG. 5 is a perspective view of a still further embodiment of the mower tilt tool of the invention.

FIG. 5 illustrates an embodiment of a tool 60 intended primarily for use in unpaved exterior ground areas. The tool 60 includes an anchor portion 21 and a pocket 22 for receiving the hand grip 31 of a handle 32 of the mower 10. The anchor portion includes a stiff rod 61 bent in a plane in an acute angle with one leg 62 of the angle being welded to the underside of the anchor portion 21. Legs 62, 63 lie in a common plane perpendicular to the flat of the anchor portion 21 and the free side or leg forms an acute angle with the anchor portion. The tool 55 is anchored in an unpaved spot by driving it into the soil with the free side 63 of the rod 61 inclined off the vertical so that when it is firmly driven into the soil, the anchor portion 21 lies flat with the soil. As described in connection with the elongated rod 52 shown in the embodiment of FIG. 3, the angled orientation of the rod part 63 increases the resistance of the tool from rising vertically.

Figure 6:
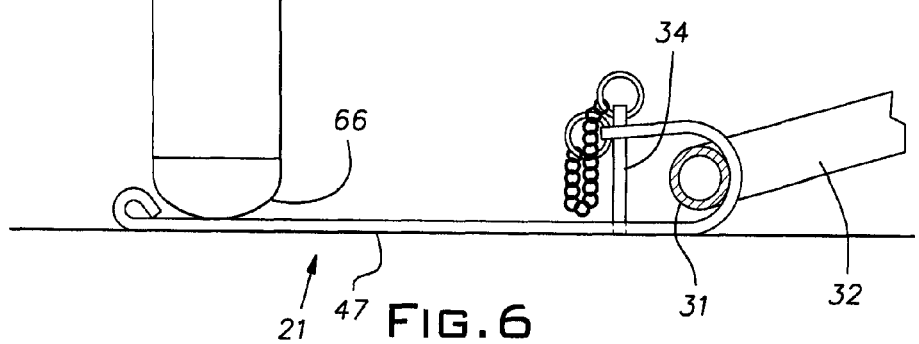
FIG. 6 is an elevational view of an embodiment of the mower tilt tool such as shown in FIG. 3 being used in a different manner.

FIG. 6 illustrates a variation in the manner in which a tool can be held down so as to hold a mower hand grip 31 and thereby tilt the mower 10. In FIG. 6, the lower section 47 of the anchor portion 21 with the receiving pocket 22 of the tool 45 shown in FIG. 3 is utilized. This part of the tool 45 is held down by a lower edge of an overhead garage door indicated at 66. It will be understood that other objects such as a swinging personnel door or a cement block or other weighty object can be used instead of the illustrated garage door 66. Moreover, it will be seen that the tool 45 can be used with the door 66 or other appropriately shaped object while the upper section 48 remains attached. Still further, it will be understood that the other tools 20 and 55 can be used in a manner like that shown in FIG. 6 with the garage door 66 or under an appropriately sized heavy and/or vertically immovable object.

While the invention has been shown and described with respect to particular embodiments thereof, this is for the purpose of illustration rather than limitation, and other variations and modifications of the specific embodiments herein shown and described will be apparent to those skilled in the art all within the intended spirit and scope of the invention. Accordingly, the patent is not to be limited in scope and effect to the specific embodiments herein shown and described nor in any other way that is inconsistent with the extent to which the progress in the art has been advanced by the invention.

What is claimed is:

1. A tool for holding a rotary lawnmower in a tilted position to expose an underside of a deck of the lawnmower for maintenance, comprising a sheet metal bracket of sufficient thickness and width to hold a horizontal hand grip of a distal end of a lawnmower handle at ground level, the bracket having a generally flat anchoring portion and a U-shaped receiving pocket having opposed sections and being joined to the anchoring portion, the anchoring portion being adapted to be operatively mounted on a vertical wall or post surface or held down at or near a floor or ground level, the receiving pocket being at least 1 in. in dimension between said opposed sections and being arranged when the anchoring portion is operatively mounted to receive the horizontal hand grip of the distal end of the lawnmower handle, the opposed sections having aligned apertures being spaced from a common bight area therebetween by a distance of at least 1 in., a hole larger than said apertures for receiving a retaining element of a size adequate to be manually driven into earth in a mid-third of a length of the bracket measured from the pocket to an opposite end of the bracket and a lock pin member deployable on said bracket by assembly in the aligned apertures in said opposed sections and being spaced entirely from said bight area by at least 1 in. to selectively retain or release the hand grip in or from the receiving pocket, the lock pin having a length permitting the lock pin to extend through said opposed sections, one end of the lock pin having an associated pull ring and an opposite end extending beyond a respective one of the opposed sections by a distance such that the opposite end can penetrate the earth when in a deployed position in said aligned apertures and be manually released from said deployed position, and a steel rod including a hand hold for applying installation and removal forces to the rod, the rod being insertable in said hole and driven into the ground to a position where it bears against the bracket to retain the bracket in contact with the ground.

* * * * *